United States Patent [19]
Moffitt

[11] 3,982,992
[45] Sept. 28, 1976

[54] PRODUCTION OF HEAT SEALS IN THERMOPLASTIC MATERIAL WITH PRESS HEAD HAVING A TEMPERATURE GRADIENT

[75] Inventor: Myron L. Moffitt, Fairport, N.Y.

[73] Assignee: Mobil Oil Corporation, New York, N.Y.

[22] Filed: Jan. 15, 1975

[21] Appl. No.: 541,296

Related U.S. Application Data
[63] Continuation of Ser. No. 330,350, Feb. 7, 1973, abandoned.

[52] U.S. Cl. .............................. 156/583; 100/93 P; 156/251; 156/306; 219/243; 428/194
[51] Int. Cl.² ........................ B32B 7/06; B32B 7/10; B32B 31/20; B65B 51/26
[58] Field of Search ............... 156/306, 251, 583; 100/93 P; 219/243; 428/194

[56] References Cited
UNITED STATES PATENTS

| | | | |
|---|---|---|---|
| 3,326,735 | 6/1967 | Beason | 156/306 |
| 3,379,595 | 4/1968 | Bracey | 156/306 |
| 3,457,132 | 7/1969 | Tuma et al. | 156/251 |
| 3,624,836 | 4/1969 | Rohdin | 156/583 |
| 3,725,189 | 4/1973 | Gidge | 156/306 |

Primary Examiner—J.C. Cannon
Attorney, Agent, or Firm—Charles A. Huggett; James D. Tierney

[57] ABSTRACT

Heat seals of improved delamination resistance are provided having increasing adhesion across the width of the seal band. The seals are produced by using a heat seal means having a temperature profile such that there is a temperature gradient in the seal width direction.

1 Claim, 8 Drawing Figures

PRODUCTION OF HEAT SEALS IN THERMOPLASTIC MATERIAL WITH PRESS HEAD HAVING A TEMPERATURE GRADIENT

This is a Continuation, of application Ser. No. 330,350, filed Feb. 7, 1973, and now abandoned.

This invention relates to joining thermoplastic materials. It more particularly refers to heat seal joining of thermoplastic films.

It is known that thermoplastic materials can be joined by heat sealing. In fact, probably the most common technique for joing thermoplastic films is by heat sealing. Heat seal joining of thermoplastic films is usually accomplished by pressing the two or more layers of film to be joined between heated pressure applying means. In most cases these means are bars and one or both of them are heated. The combined action of the heat and the pressure exerted by the bars on the film layers for an appropriate time melts or softens the layers of thermoplastic film and causes such to flow together and fuse. Upon removal of the heat and pressure, but still maintaining the film layers together, the fused thermoplastic material resolidifies in a joined condition.

In conventional heat sealing, the thermoplastic material immediately adjacent to the sealing means is heat softened and perhaps melted to a greater or lesser extent in relation to the distance from the heat seal means. This unsealed but melted or softened material adjacent the heat seal then becomes a weak point or area in the joined thermoplastic layers possible because the layer has been thermally degraded adjacent the seal for the reasons given above, or, in the case of uniaxially or biaxially oriented film being heat sealed, because the heating causes a relaxation in the orientation and therefore a diminution in the improved tensile properties contributed by orientation. Further, there appears to be stress concentration at the point where the two unsealed layers intersect the sealed area because of the geometric and physical discontinuities at this intersection. Therefore, a strain imposed on the sealed layers, particularly a strain which tends to peel the heat sealed area, often causes one or more of the layers to fail, usually adjacent to the heat seal.

It is therefore an object of this invention to provide a novel heat seal which obviates these difficulties.

It is another object of this invention to provide a novel means of heat sealing thermoplastic material.

It is a further object of this invention to provide a novel heat sealing technique which does not substantially deleteriously affect the area of the thermoplastic adjacent the heat seal.

Other and additional objects of this invention will become apparent from a consideration of this entire specification including the drawing and the claims hereof.

Understanding of this invention will be facilitated by reference to the drawing in which.

Figure 1:
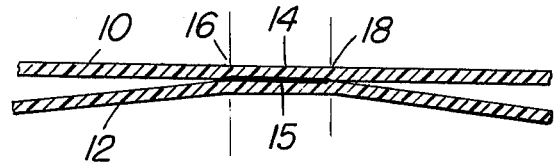
FIG. 1 is a schematic elevation in section of a heat seal made according to the prior art.

In accord with and fulfilling these objects, one aspect of this invention resides in a heat seal of two or more layers of thermoplastic material which is progressively stronger from one edge to the other. Illustrating the practice of this invention by referring to a band type heat seal of two layers of thermoplastic film, in the prior art, the degree of adhesion of the two films to each other is substantially the same throughout the band width. In contrast to this, according to the instant invention the degree of adhesion of the two film layers is progressive across the seal band width; that is at one edge of the heat seal band there is a minimum, or perhaps substantially zero, adhesion between the two layers and at the other edge of the heat seal band, the adhesion between the two layers is a maximum (the absolute numerical value of this maximum is of course dependent upon the heat seal parameters, e.g. temperature pressure, time and the particular thermoplastic being sealed). The change in adhesion from one edge to the other may be non-linear, depending upon how the heat seal is applied. However, the more usual and simpler heat sealing technique according to this invention results in a substantially linear change in adhesion across the heat seal band width.

It has been found that heat seals applied according to this invention do not fail abruptly by tearing, rupture or inelastic elongation of a film layer adjacent to the seal as did prior art seals, but rather the layers in the seal itself tend to peel apart in proportion to the strain placed on the seal until a point is reached where the adhesion strength of the seal is equal to the strain being impressed on the seal whereupon the seal and the film layers resist further damage. If then additional strain is impressed on the seal, either it will peel further until equilibrium is reached or one layer will rupture or elongate if its tensile strength is lower than the tensile strength of the seal itself.

Progressive yielding of seal described herein appears to absorb energy from the force acting to disrupt the seal. It is believed that this absorption of energy is what causes this seal to resist failure to a greater extent than conventional seals. This characteristic is referred to as toughness.

As a general proposition, substantially any heat sealable thermoplastic is suited to use in this invention in any form in which it is ordinarily heat sealed, e.g. film of substantially any thickness. Representative thermoplastics are polyethylene, polypropylene, polystyrene, polyvinyl chloride, acrylic polymers, olefin copolymers, nylons, polyesters, polycarbonates, polyethers, polyacetates and other similar materials. The heat sealing conditions used are the same as those known to the prior art in terms of nominal temperature, pressure and time of sealing.

One of the major differences between the practice of this invention and heat sealing as it is carried out in the prior art is that in the prior art the sealing bar was substantially uniformly heated whereas according to this invention there is a temperature gradient in the sealing bar or bars from one long edge to the other. For example, a sealing bar may have a heating source, e.g. resistance wire or the like, located adjacent one edge thereof and a cooling source or heat sink located adjacent the other edge thereof. Heat will therefore flow from the heated edge toward the cooled edge whereby the bar will have a decreasing temperature from the heated edge toward the cooled edge.

A geometric alternative providing such a heat gradient can for example comprise a heated seal bar composed of two members joined together along a saw tooth line between the two above-referred to edged with one of said members being heat conductive and the other being a heat insulator. With this configuration a heat gradient will be induced in the seal bar as a whole when such is heated even if the heat inut is uniform. Variations of this configuration using different geometric junction lines and/or using more than two materials of different heat conductivity are well within the scope of this invention. Of particular interest is a single saw tooth or transversely slitted seal bar used as an impulse sealer with electric current passed longitudinally through the bar. With constant electrical input, the bar will be cooler at the saw tooth or slitted edge than at the other edge thereby producing a profiled seal as set forth herein. In fact, the only critical matter with respect to the seal bar is that it in some way may apply heat to the thermoplastic being heat sealed in a non-uniform manner as aforesaid.

Referring now to the drawing, the heat sealed thermoplastic layers shown in FIG. 1 comprise a first layer 10 and a second layer 12. The heat seal 14 is a band seal extending from one edge 16 to another edge 18 with the actual fusion at 15. The character of the heat seal, that is, the degree of fusion within the seal is substantially the same at both edges 16 and 18 as well as in the area between these edges.

Figure 2:
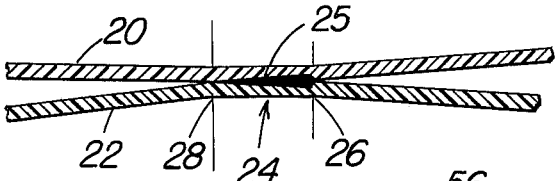
FIG. 2 is a schematic elevation in section of a heat seal made according to this invention.

In FIG. 2 is a seal is shown which is similar except that it was made according to this invention. Two layers 20 and 22 of thermoplastic film are gradiently heat sealed together at 24 from one edge 26 with the actual fusion at 25 at which the layers 20 and 22 are maximally fused and adhered together to another edge 28 at which the layers 20 and 22 are minimally fused and adhered together. The degree of fusion and adhesion gradually increases from the edge 28 to the edge 26.

Figure 3A:
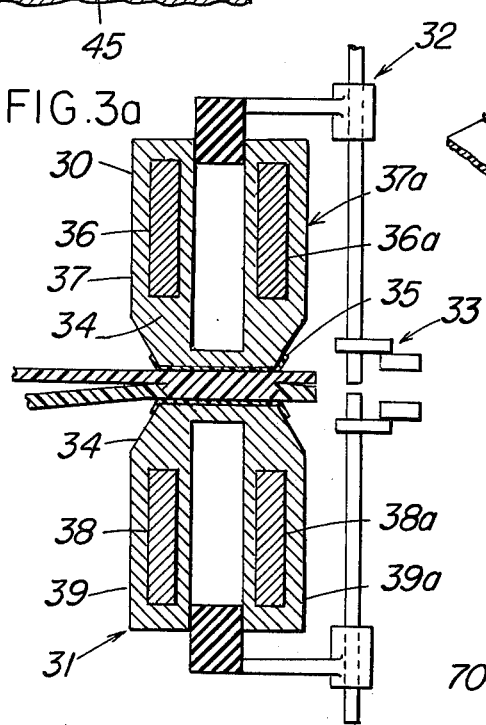
FIG. 3a is a schematic elevation in section of a technique of heat sealing according to this invention.
Figure 3B:
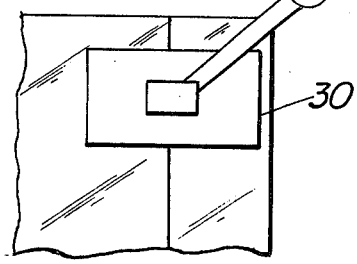
FIG. 3b is a plan view of a technique of heat sealing according to this invention.

FIGS. 3a and 3b show one type of heat seal bar assembly for use in this invention. It comprises an upper seal bar 30 and a lower seal bar 31 associated together through means 32 for bringing the bars toward each other and including pressure controlling means or mechanical stop means 33 to prevent the seal bars from getting too close together. Each seal bar 30 and 31 is composed of a conductive material 34 which may be covered with a suitable non-stick material 35 as is known in the art. The seal bars are constructed in a U-shape with a heating means 36a and 38a in one leg 37a and 39a and a heat sink or heat withdrawing means 36 and 38 in the other leg 37 and 39. Heat input by the heating means 36a then flows from the leg 37a to the leg 37 and from the leg 39a to the leg 39 creating a temperature gradient across the face of the seal bar decreasing from the legs 37a and 39a respectively toward the legs 37 and 39.

Figure 4:
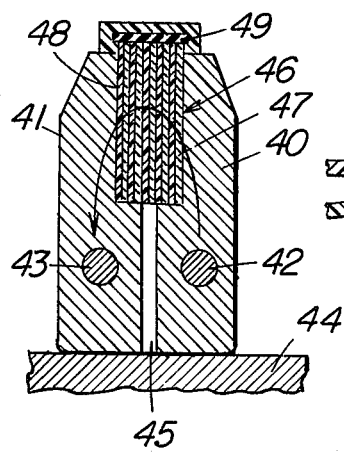
FIGS. 4, 5, 6 and 7 are similar to FIGS. 3a and 3b showing different types of heat sealing hardware which are useful in this invention.

FIG. 4 shows another type of heat seal bar construction. It should be noted that only the bar is shown in this figure for simplicity. Its operation is much the same as the bars in FIG. 3. This seal bar comprises two legs 40 and 41 each of which are conductive and each of which has a heater 42 and 43 disposed therein adapted to heat one leg 40 to a higher temperature than the other leg 41. Both legs are joined to a suitable heat sink substrate 44 in such manner as to leave an insulating gap between the legs. The legs are joined together remote from the substrate 44, through the actual sealing means 46 which is suitably a layered composite of conductive, e.g. aluminum, members 47 and non-conductive members 48. Suitably a non-stick member 49 is provided over the actual sealing means 46. While the heat flows well in the individual legs 40 and 41, it does not flow well across the gap 45 or across the sealing means 46. Therefore, a temperature differential, substantially the same as the temperature differential of the two heating means 42 and 43, is set up across the sealing means 46.

Figure 5:
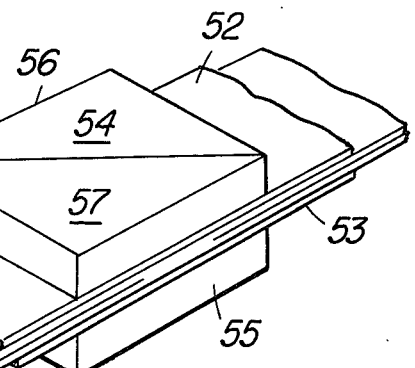

In FIG. 5, which is a perspective view of a bandtype sealer, two films of thermoplastic material 50 and 51 are heat sealed by being held between conductive upper and lower heating blocks 54 and 55 respectively. Each heating block is made up of a heated section 56 and a cooler section 57 whereby establishing a heat input differential as the band and film layers move from one end of the block to the other and effectively profiling the heat seal thus formed.

Figure 6:
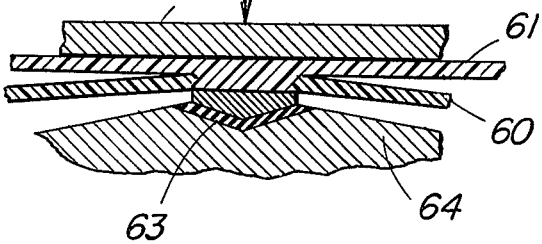

FIG. 6 shows a construction adapted to be used with ribbon type impulse sealers. In this assembly two layers of thermoplastic film 60 and 61 are brought together between a pressure blanked 62 and a seal ribbon 63. The seal ribbon is so shaped as to lose heat into a heat sink 64 remote from the thermoplastic films whereby causing graduated fusion of the films together. The ribbon 63 may be doubly tapered as shown or it may be singly tapered down toward the side of the seal being made which will later be subject to stress.

Figure 7:
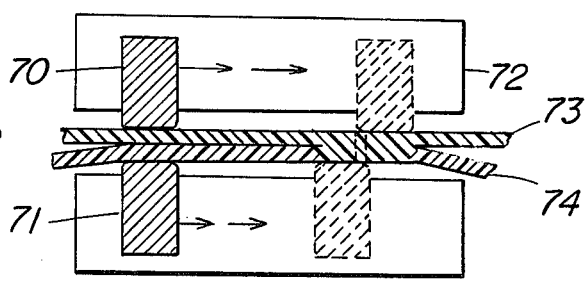

FIG. 7 shows two conventional seal bars 70 and 71 both heated and constructed in a conventional manner, suitably to the same temperature. Drive means 72 are provided for bringing the seal bars into contact with two layers of thermoplastic film 73 and 74 at different rates so that, as shown in dashed lines, the seal bars 70 and 71 actually slide with respect to each other whereby unevenly heating the films and producing a graduated heat seal therein.

The following Examples are illustrative of this invention without being limiting thereon. All parts and percentages are by weight unless expressly stated to be to the contrary.

EXAMPLE 1

Two high density polyethylene films, each measuring 2.2 mils in thickness, were heat sealed together using a sealing bar of the type shown in FIG. 4 with the heater 42 heating its leg to 320°F on the hot side of the sealing means 46 and to 310°F on the cooler side of the sealing means 46.

The heat seals so made had a nominal width of ¼ inch and were able to withstand a tensile stress of 7.4 pounds per linear inch applied in peel without either the films or the seal failing. Failure energy for this seal required was 0.22 foot pounds per inch square.

In contrast to this, identically dimensional heat seals made in identical film at the same temperature as the hot side above but applied across the whole seal bar failed at a tensile stress of 5.7 pounds per linear inch by one of the films inelastically elongating adjacent the seal and finally rupturing within this elongation. Failure energy for this seal was 0.18 foot pounds per inch square.

The tensile strength of the film itself was 8.2 pounds per square inch. Failure energy was 2.9 foot pounds per inch square.

EXAMPLE 2

Example 1 was repeated with films of 1.0 mil thick low density polyethylene resulting in tensile strengths of 3.3 pounds per linear inch for the profiled seal of this invention compared to 2.4 pounds per lineal inch for non-profiled seal. Failure energies were 0.84 and 0.24 foot pounds per inch square for the profiled and non-profiled seals respectively.

EXAMPLE 3

Example 1 was repeated with films of 4 mil thick low density polyethylene films resulting in tensile strengths of 5.8 pounds per linear inch for the profiled seal of this invention compared to 4.2 pounds per lineal inch for nonprofiled seal. Failure energies were 2.4 and 0.85 foot pounds per inch square for the profiled and non-profiled seals respectively.

What is claimed is:

1. Heat sealing apparatus comprising a substantially heat sink substrate, two conductive legs extending from said substrate, heat insulation between said legs adjacent said substrate, heating means operatively associated with at least one of said legs and seal bar means joining said legs remote from said substrate, wherein said seal bar means is less heat conductive than said legs such that a temperature differential is established between the side thereof adjacent said heated leg and the opposite side thereof, said seal bar being further characterized as comprising multiple alternating layers of conductive and non-conductive material.

* * * * *